United States Patent [19]
Yoshihara et al.

[11] Patent Number: 5,176,159
[45] Date of Patent: Jan. 5, 1993

[54] LENS CASE FOR CONTACT LENS CLEANING DEVICE

[75] Inventors: Mikio Yoshihara, Kariya; Tomio Oguma, Anjo; Masasi Kai, Toyota, all of Japan

[73] Assignee: Aisin Seiki Kabushiki Kaisha, Kariya, Japan

[21] Appl. No.: 766,732

[22] Filed: Sep. 27, 1991

[30] Foreign Application Priority Data

Sep. 29, 1990 [JP] Japan ................... 2-261996

[51] Int. Cl.$^5$ .............................................. B08B 3/02
[52] U.S. Cl. .................... 134/186; 134/199; 134/200; 134/901
[58] Field of Search ............... 134/901, 200, 155, 186, 134/199, 155, 188, 182; 206/5.1

[56] References Cited

U.S. PATENT DOCUMENTS

| | | | |
|---|---|---|---|
| 2,900,991 | 8/1959 | Arnold | 134/199 X |
| 3,108,025 | 10/1963 | Gutterman | 134/199 X |
| 3,115,146 | 12/1963 | Erwin | 134/901 X |
| 3,168,100 | 2/1965 | Rich . | |
| 3,614,959 | 10/1971 | Schollmaier et al. . | |
| 3,682,185 | 8/1972 | Murray et al. | 134/199 X |
| 4,582,076 | 4/1986 | Prat . | |
| 4,637,919 | 7/1987 | Ryder et al. . | |
| 4,852,591 | 8/1989 | Wisotzki et al. . | |
| 4,852,592 | 8/1989 | DiGangi et al. . | |
| 4,986,290 | 1/1991 | Oguma et al. . | |

FOREIGN PATENT DOCUMENTS

| | | | |
|---|---|---|---|
| 696160 | 8/1940 | Fed. Rep. of Germany | 134/199 |
| 25174 | 10/1914 | Norway | 134/199 |
| 776665 | 11/1980 | U.S.S.R. | 134/199 |

Primary Examiner—Frankie L. Stinson
Attorney, Agent, or Firm—Finnegan, Henderson, Farabow, Garrett & Dunner

[57] ABSTRACT

A lens case for a contact lens cleaning device comprises a receiving case including a pair of holding chambers for accommodates a pair of both contact lenses and a cover which is detachably coupled to said receiving chamber for opening/closing the holding chamber. The receiving case comprise a pair of first introductory conduits each of which include an entrance opening to a bottom of the receiving case and an exit opening to the holding chamber so as to confront to a center of one side surface of the contact lens which is accommodated in the holding chamber. And the cover comprises a pair of second introductory conduits each of which includes an entrance opening to an outside wall of the cover and an exit opening to the holding chamber so as to confront to a center of another side surface of the contact lens which is accommodated in the holding chamber, and plural discharging conduit which include an entrance opening to the holding chamber so as to confront to periphery of the contact lens and an exit opening to an upper surface of the cover, respectively.

6 Claims, 4 Drawing Sheets

LENS CASE FOR CONTACT LENS CLEANING DEVICE

BACKGROUND OF THE INVENTION

1. Field of the Invention

This invention relates to a lens case for a contact lens cleaning device, and more particularly to a lens case for a contact lens cleaning device which washes the contact lens by using a cleaning liquid.

2. Description of the Related Art

Generally, before wearing a pair of contact lenses a user washes the contact lenses as follows. First of all, each contact lens is put on their palm or fingers, and the lens is washed by rubbing with fingers after a cleaning liquid is dropped on a surface of the contact lens. Thus stains, particularly a fat contained in tears, are removed. After washing, the lens is rinsed with a rinsing water such as a distilled water and is sterilized by boiling in a preserving liquid such as a physiological saline solution. After boiling, it is kept in the preserving liquid such as a physiological saline solution till the next use of the lens is used next.

On the other hand, applicants of this case have developed a contact lens cleaning device to clean and sterilize by boiling the contact lens with effect. In this device, the contact lens is washed by swirl current which is generated by stirring means positioned in a disposal chamber. After that, the contact lenses are sterilized by cleaning liquid which is boiled by a heater in the disposal chamber. The contact lens cleaned by this device is positioned in the disposal chamber while the contact lenses are in lens case. As shown in FIG. 9, the lens case is composed of a container body 6 and a cover 7. The container body 6 includes a receiving chamber 65 which accommodates a contact lens W and an upper surface of the container body is opened. The cover 7 closes the container body 6 and the opening/closing of the receiving chamber 65 is established by the cover 7. The container body 6 and the cover 7 have plural penetrating holes 60 and 70 respectively, thereby establishing the liquid communication between the receiving chamber 65 and the outside of the container body 6.

In the case of cleaning the contact lens W using the contact lens cleaning device, the contact lens is accommodated in the receiving chamber 65 of the lens case and the lens case is disposed in the disposal chamber of the device. The swirl current which is generated by stirring means flows into the penetrating holes 60, 70 of the lens case, and current thereof washes the dirt on the surface of the contact lens W and flows out from the other penetrating holes 60, 70. But the current which flows in the receiving chamber 65 is apt to be controlled by the swirl current which is generated by stirring means. Thus if the contact lens W faces to the swirl current vertically, the swirl current attacks one side of the contact lens and another side thereof is difficult to clean. Still more if the contact lens W faces the swirl current horizontally, the concave side is difficult to clean.

SUMMARY OF THE INVENTION

It is an object of the present invention to provide an improved lens case for contact lens cleaning device which obviates the above conventional drawbacks.

It is another object of the invention to provide an improved lens case for contact lens cleaning device which can clean both sides of the contact lens.

In order to attain the foregoing objects, a lens case for a contact lens cleaning device comprises a receiving case including a pair of holding chambers for accommodating a pair of both contact lenses and a cover which is detachably coupled to said receiving case for opening/closing the holding chamber. The receiving case comprises a pair of first introductory conduits each of which include an entrance opening to a bottom of the receiving case and an exit opening to the holding chamber so as to confront a center of one side surface of the contact lens which is accommodated in the holding chamber. And the cover comprises a pair of second introductory conduits each of which includes an entrance opening to an outside wall of the cover and an exit opening to the holding chamber so as to confront a center of another side surface of the contact lens which is accommodated in the holding chamber, and plural discharging conduits which include an entrance opening to the holding chamber so as to confront the periphery of the contact lens and an exit opening to an upper surface of the cover, respectively.

The holding chamber is a space which can accommodate a contact lens. It is preferred that a pair of the holding chambers are formed in order to accommodate a pair of contact lens. It is desirable that an inside wall of the holding chamber is formed so as to correspond to a shape of the contact lens, and that at least a wall which composes the holding chamber is formed by material more flexible (for example, elastomer, silicone rubber) than the contact lens. In this case, it is possible to form the lens case in a body or by assembled with parts.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DESCRIPTION OF THE PREFERRED EMBODIMENTS

A lens case of a contact lens cleaning device according to an embodiment of this invention will be described with reference of the drawings.

Figure 1:
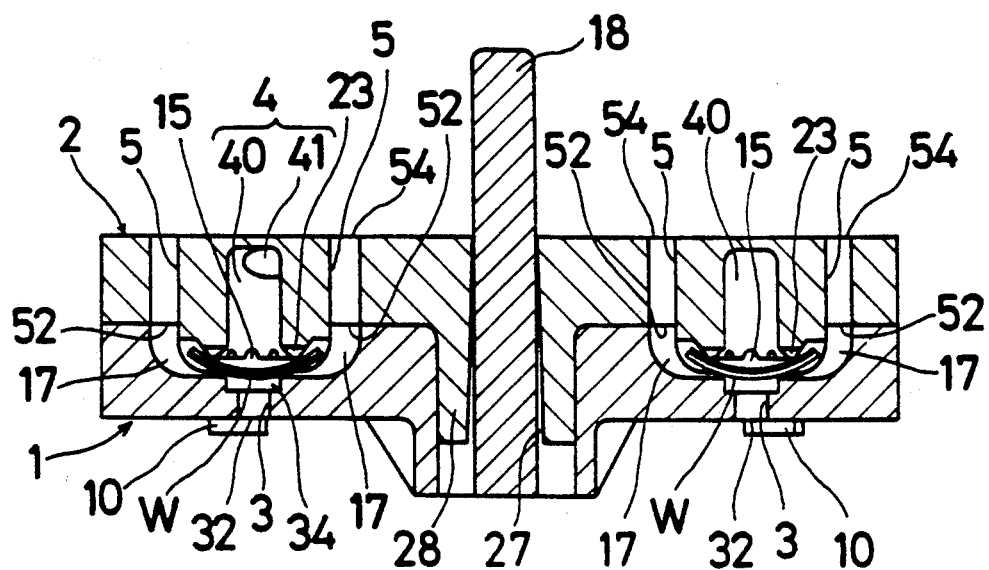
FIG. 1 is a cross sectional view of a lens case according to the present invention.

Referring to FIG. 1, a lens case according to this embodiment includes a receiving case 1 having a pair of receiving chambers 15 each of which receives a contact lens W from its opened upper side thereof and a pair of first introductory conduits 3 which guide a liquid to the receiving chamber 15, and a cover 2 having a pair of second introductory conduits 4 which guide the liquid to the receiving chamber 15 and plural discharging conduits 5 which guide the liquid out of the receiving chamber 15.

Figure 2:
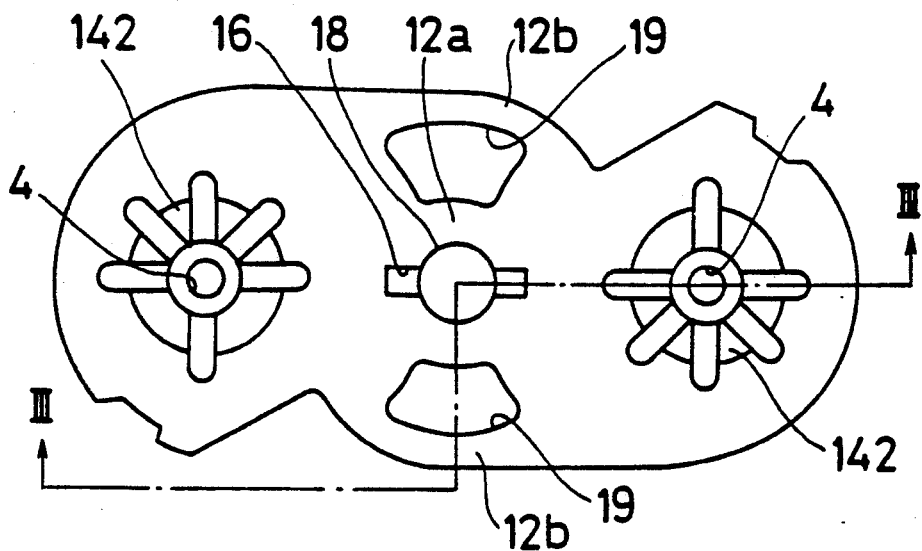
FIG. 2 is a plan view of a receiving case according to this invention.
Figure 3:
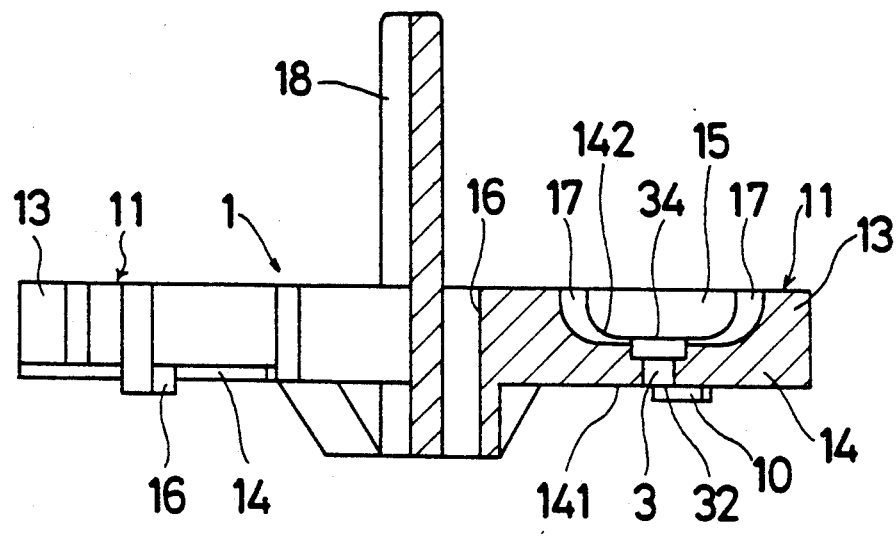
FIG. 3 is a cross sectional view taking along line III—III in FIG. 2.
Figure 4:
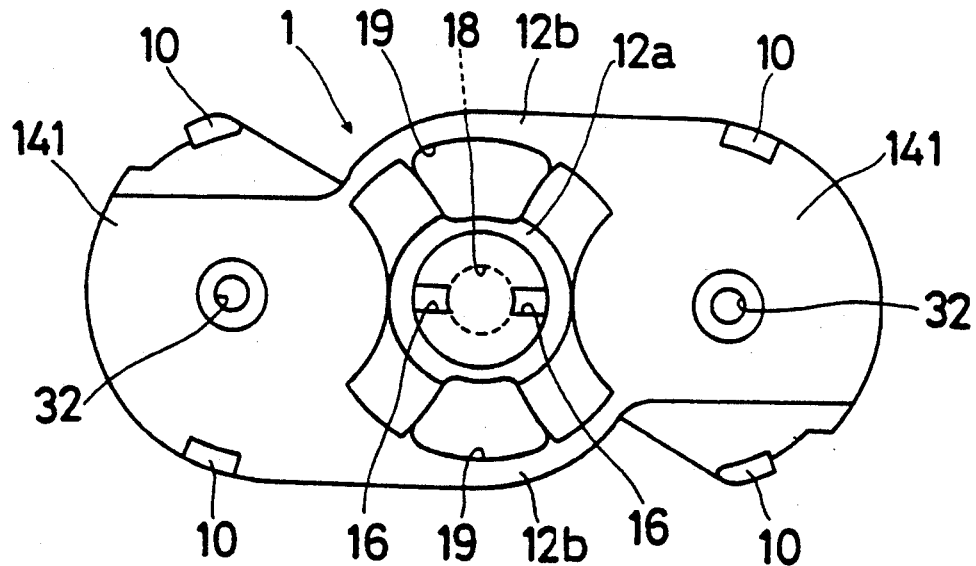
FIG. 4 is a bottom view of a receiving case according to this invention.

As shown in FIG. 2-FIG. 4, the receiving case 1 comprises a pair of holding portions 11 having a side wall 13 and a bottom portion 14 for closing a lower portion of the side wall 13, a center connecting portion 12a which connects the pair of holding portions 11, and a pair of side connection portions 12b. The receiving case 1 is formed by flexible elastomer. Each holding portion 11 has a holding chamber 15 which is partitioned by the side wall portion 13 and the bottom portion 14, and an upper surface of the holding chamber 15 is opened upwardly. Each bottom portion 14 is formed with a first introductory conduit 3 which guides a cleaning liquid to the inside of the holding chamber 15, and the first introductory conduit 3 includes an entrance 32 which opens to a center of a back side of each bottom portion 14 and an exit 34 which opens to a center of an inner side 142 of the holding chamber 15. The inner side 142 has six radial grooves 17 which connect the center of the exit 34 and an upper side of the side wall 13. An angular pitch between two adjacent grooves 17 is set to be spaced by 45 or 90 degrees. Furthermore the center connecting portion 12a has a projection bar 18 which projects upwardly. The projection bar 18 is inserted into a pipe portion 28 of the cover 2. Across each of which is set to receive a projection bar 18, there are formed a pair of opposed fit two holes 16 of the pipe portion 28. Between the center connecting portion 12a and each side connection portion 12b, a sector or a fan-shaped hole 19 is formed, and 4 supporting projections 10 are formed around the bottom portion of the receiving case 1.

Figure 5:
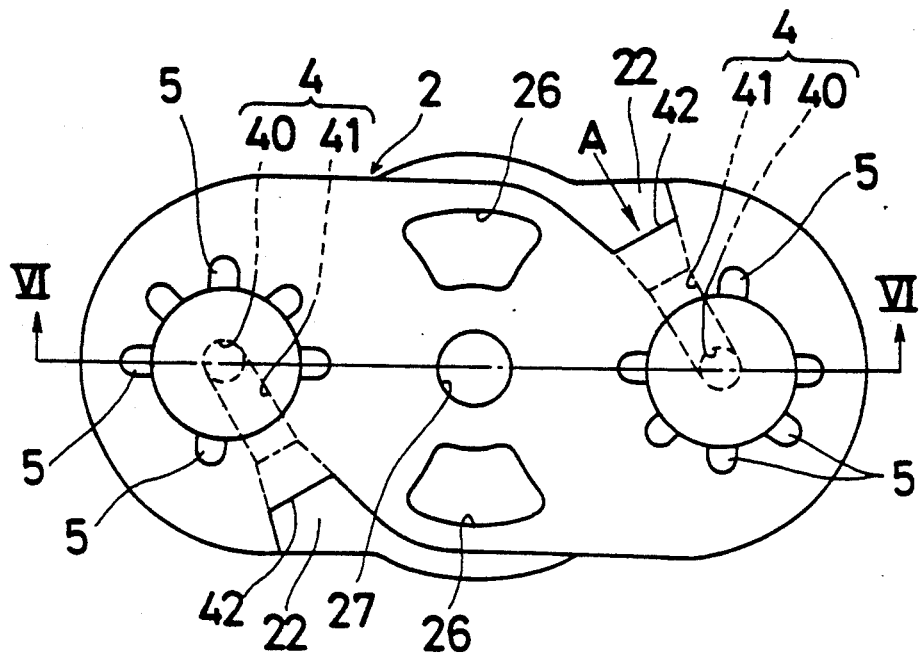
FIG. 5 is a top view of a cover according to the prevent invention.
Figure 6:
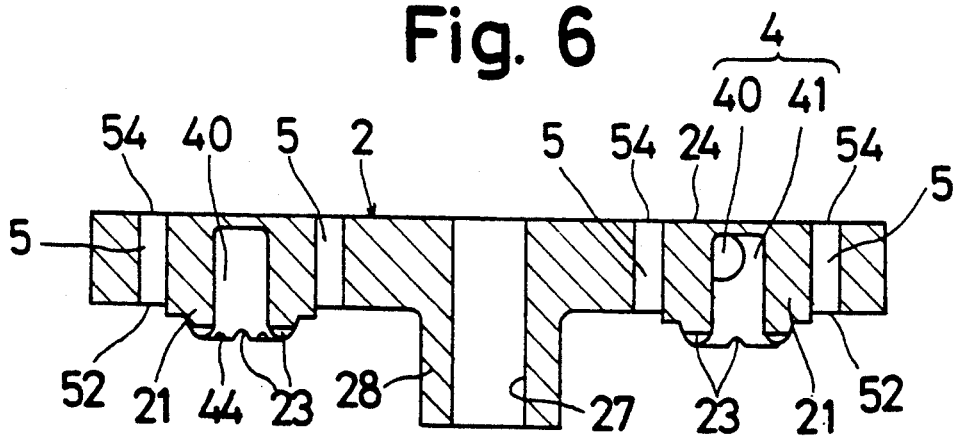
FIG. 6 is a cross sectional view of a cover according to this invention.
Figure 7:
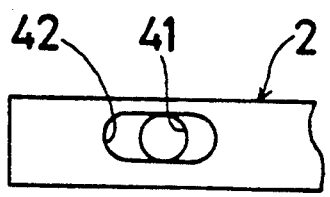
FIG. 7 is a part of a front view shown in the direction of an arrow B in FIG. 5.

The cover 2 is described referring to FIG. 5 and FIG. 6. An outline shape of the top view of the cover 2 is identical to that of the receiving case 1, and the cover 2 is formed by elastomer. At a portion of the back side of the case 2 which correspond to each chamber 15, there are formed a pair of fitting portions 21 each of which is in the form of a projection to be fitted in an inner surface of the side wall 13. Each fitting portion 21 is a portion which closes the upper opening of the holding chamber 15. While the upper opening of the holding chamber 15 is closed by the fitting portion 21, the height of the holding chamber 15 is slightly larger than the thickness of the contact lens. A periphery of each fitting portion 21 has a step which adjust a concave form of the contact lens. In the center of each fitting portion 21 a cylindrical space 40 in the form of the blind bore which extends to up and down is formed. The cylindrical space 40 faces the exit 34 of the first introductory conduit 3 of the receiving case 3 and is connected to outside of the receiving case 1 through the penetration 41 which penetrates straightly between a side of an upper portion of the cylindrical space 40 and the side of the cover 2. As mentioned above, a pair of second introductory conduits 4 are formed, each of which comprises an entrance 42 opening to the side of the cover 2 and an exit 44 formed in the opening of the cylindrical space 40. As shown in FIG. 5, a pair of the second introductory conduits 4 are set to be in parallel with each other, and each entrance 42 is formed so as to be slightly off set in the inward direction at the rim of the case 2. Near the entrance 42 a guide 22 is shaped to guide the cleaning liquid into the entrance 42. On the other hand, near the exit 44 which is formed on the lower portion of each fitting portion 21, six guide grooves 23 which extend radially are formed to correspond to six grooves 17 which are formed on the receiving case 1. Furthermore 6 exit passages 5 which penetrate the receiving case 1 vertically are shaped in the outside of the rim of each fitting portion 21 to face each groove 17 formed on the receiving case 1. The exit passage 5 includes an entrance 52 which opens to a periphery of the holding chamber 15 and an exit 54 which opens to an upper surface 24 of the cover 2. The pipe portion 28 including a pipe passage 27 which is inserted by the projection bar 18 is formed to project from the back side of the cover 2. And fan-shaped holes 26 which penetrate the cover 2 vertically are shaped to face the fan-shaped holes 19 of the receiving case 1.

Operation and use of the described embodiment are as follows.

First of all, before cleaning the contact lens by cleaning liquid, the cover 2 is removed from the receiving case 1 and the holding chamber 15 is opened. Next, each contact lens W is put upon the exit 34 of the first introductory conduit 3 to face the center of a convex surface of the contact lens. While the pipe passage 27 of the cover 2 is inserted by the projection bar 18 of the receiving case 1, the holding chamber 15 is closed and each opening thereof fits to the fitting portion 21. Under this condition, the center of concave surface of the contact lens W which is accommodated in the holding chamber 15 opposite to the exit 44 of the second introductory conduit 4.

Figure 8:
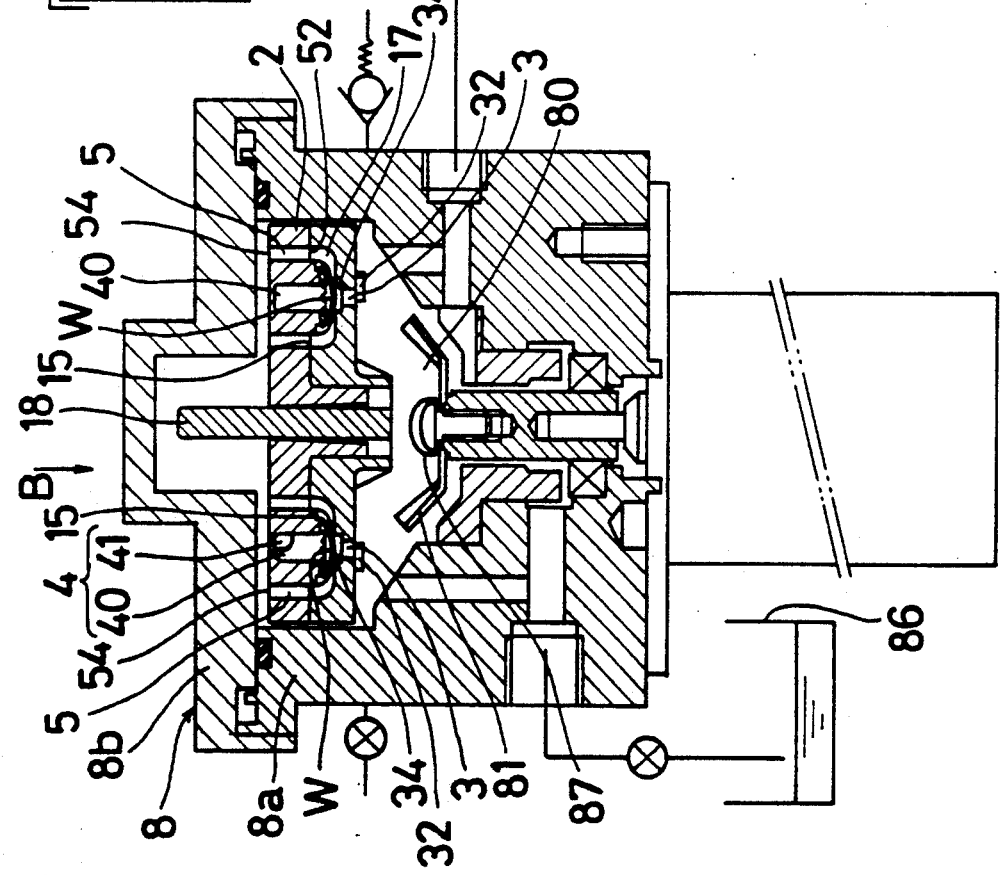
FIG. 8 is a cross sectional view of a lens case of the contact lens cleaning device according to this invention.
Figure 9:
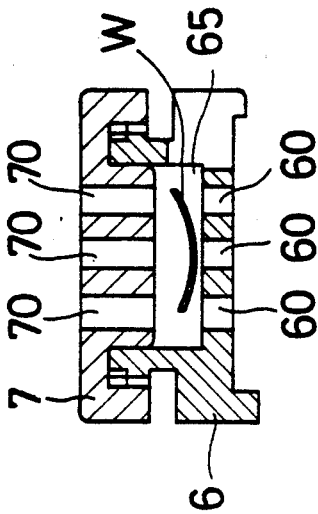
FIG. 9 is a cross sectional view of the lens case according to the conventional invention.

After that, the lens case which accommodates the contact lens is set by holding the bar 18, for example, in a disposal chamber 80 of a disposal device 8 as shown in FIG. 8. After the lens case is set, the first introductory conduit 3 which is formed on the bottom of the receiving case 1 is located at a portion of slightly outside of the upper side of the distal end portion of a impeller 81. The disposal chamber 80 is formed to open to the center of the upper surface of the housing 8a. The disposal chamber 80 is covered by a housing cover 8b which opens or closes it so as to be sealed.

If a start switch (not shown) of the disposal device 8 is on, the cleaning liquid is supplied from a liquid tank 82 to the disposal chamber 80, and the impeller 81 which is installed in the disposal chamber 80 rotates clockwise as seen from the direction B (FIG. 8). Thereby a clockwise swirl as seen from the direction B is generated in such a manner that the liquid level of the cleaning liquid rises and lowers at outer periphery and the center portion of the disposal chamber 80, respectively. The swirl enters into the holding chamber 15 from the entrance 32 of the first introductory conduit 3 which is formed on the bottom side of the lens case and the entrance 42 of the second entrance which is formed on the side of the entrance 32, and goes out or is discharged from the exits 34, 44. Thereby, after the swirl which flows to the both surfaces of the contact lens W attacks the surface thereof almost vertically, it flows out along the surface of the contact lens and joins again, and flows out through the exits 54 of the plural discharging conduits 5 from the entrance 52 thereof and out of the lens case. Therefore dirt and fat which were put on the contact lens is removed or cleaned completely and efficiently by the swirl which flows in the holding chamber 15. The first introductory conduit 3 and the second introductory conduit 4 are shaped in order to set water pressures of the swirls which flow out from the exits 34, 44 to be equal. So the contact lens W floats at the center of the holding chamber 15 and the contact lens W is hardly touched by a wall of the holding chamber 15. Furthermore if the contact lens touch the wall of a holding chamber they are not damaged because the wall is formed by flexible material.

After the cleaning process, the cleaning liquid in the disposal chamber 80 is discharged to the discharging tank 86, and a rinsing process is operated in such a manner a rinsing liquid which is supplied from the rinsing tank 83 to the disposal chamber 80 similar to the cleaning process. After the rinsing process, a preserving liquid which is supplied from the preserving tank to the disposal chamber 80 is boiled by the heater 87, whereby the contact lens W is boiled and sterilized. After the sterilizing process, the contact lens W,W are held as they until the next use thereof.

As mentioned above, each process that use the swirl is applied to both surfaces of the contact lens completely and efficiently. In this embodiment, first introductory conduit 3 and the second introductory conduit 4 are formed in order to be equal in the introducing water pressure of the liquid. Therefore the contact lens W flows in the center of the holding chamber 15 and damage of the contact lens can be prevented.

Furthermore the receiving chamber and the cover 2 are formed by the slastomer which is more flexible than the contact lens. So, if the contact lens touches or abuts to the wall of the holding chamber 15, surface of the contact lens is not damaged.

Obviously numerous modifications and variations of the present invention are possible in light of the above teachings. It is therefore to be understood that within the scope of the appended claims, the invention may be practiced otherwise than as specifically described herein.

What is claimed is:

1. A contact lens cleaning apparatus comprising:
    a housing having a disposal chamber;
    means for feeding liquid to said disposal chamber;
    means for discharging liquid from said disposal chamber;
    stirring means including an impeller in said disposal chamber; and
    case means for retaining a pair of contact lenses above said stirring means in said disposal chamber, said case means comprising:
        a receiving case having a bottom surface and a pair of holding chambers above the bottom surface for receiving the pair of contact lenses,
        a pair of first introductory conduits each including a single entrance opening at said bottom surface and located outwardly and above a distal end portion of said impeller, and a single exit opening to said holding chamber and confronting the center of one side surface of a contact lens received in said holding chambers, respectively, and
        a cover, having perpendicular outer and upper surfaces, and releasably secured to said receiving case for opening and closing said holding chambers, said cover including a pair of second introductory conduits each having a single entrance opening to an outer surface of the cover and a single exit opening to one of said holding chambers to confront the center of an opposite side surface of a contact lens received in said holding chambers, respectively, and a plurality of discharge conduits each including an entrance opening to a holding chamber to confront the periphery of a contact lens and an exit opening to an upper surface of said cover.

2. A contact lens cleaning apparatus as recited in claim 1, wherein said case means is formed of a flexible material.

3. A contact lens cleaning apparatus as recited in claim 2, wherein said case means is formed of flexible elastomer.

4. A contact lens cleaning apparatus as recited in claim 1, wherein said first introductory conduits and said second introductory conduits are formed so that liquid pressure from said first introductory conduits is equal to liquid pressure from said second introductory conduits.

5. A contact lens cleaning apparatus as recited in claim 1 wherein said entrance opening of said secondary conduits are formed along the periphery of the outer surface of said cover.

6. A contact lens cleaning apparatus as recited in claim 1, wherein said pair of second introductory conduits are parallel to each other and each includes guide means for directing cleaning liquid into the entrance opening thereof.

* * * * *